United States Patent [19]
Hamlin et al.

[11] 3,754,356
[45] Aug. 28, 1973

[54] POSITIONING MACHINE

[75] Inventors: Frank B. Hamlin, Edwardsville, Ill; Willis L. Wells, Clayton, Mo.

[73] Assignee: Hamlin Casting Corp., Edwardsville, Ill.

[22] Filed: Feb. 28, 1972

[21] Appl. No.: 229,859

[52] U.S. Cl. .................... 51/233, 214/1 R, 269/71
[51] Int. Cl. ............................................ B24b 47/08
[58] Field of Search ................. 214/1 BB, 1 R, 1 F, 214/1 Q, 1.1, 1.2, 1.3, 1.4, 1.5; 51/230, 231, 232, 233, 93, 122, 123

[56] References Cited
UNITED STATES PATENTS
2,080,976  5/1937  Wood .............................. 51/233 X
3,397,656  8/1968  Ararotin ........................... 51/93 X FOREIGN PATENTS OR APPLICATIONS
74,850     1/1961  France ............................. 214/1 R
1,164,625  3/1964  Germany .......................... 214/1 R Primary Examiner—Gerald M. Forlenza
Assistant Examiner—Frank E. Werner
Attorney—Edward A. Boeschenstein et al.

[57] ABSTRACT

A positioning machine has a rotatable spindle which carries objects to be positioned, and that spindle is journaled in a shiftable carriage which in turn is mounted on another shiftable carriage. The two carriages move in directions perpendicular to one another and each is shifted by a motor which may be an air cylinder or a hydraulic cylinder. Each carriage further has its own positioning turret for determining the distance it moves, and that turret is provided with a plurality of positioning rods. As the turret rotates, its positioning rods individually pass through a control position, and the rod in the control position at any given time forms a blockage between the carriage and the supporting structure for that carriage, so as to control the distance the carriage moves. The spindle is also operated by a motor which likewise may be an air or a hydraulic cylinder, and geared to the spindle is a rack, the movement of which is determined by still another turret. That turret has rods, the control position for which is in alignment with the end of the rack, so that the rod in the control position at any given time forms a blockage between the end of the rack and the carriage which supports the spindle, thus controlling movement of the rack and the angular position of the object. The three turrets are mechanically connected so that they rotate in unison and are indexed by a single indexing mechanism.

18 Claims, 9 Drawing Figures

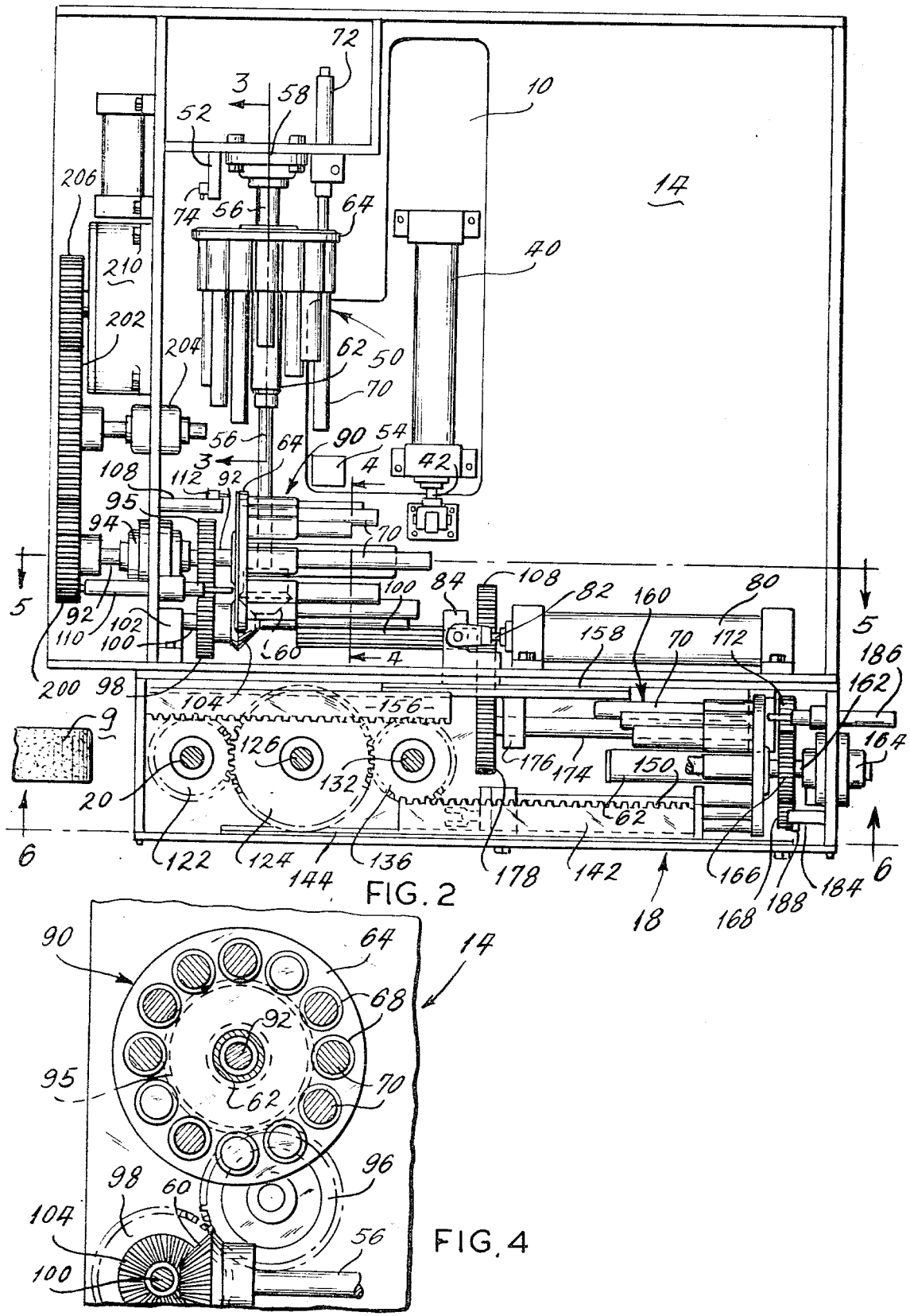

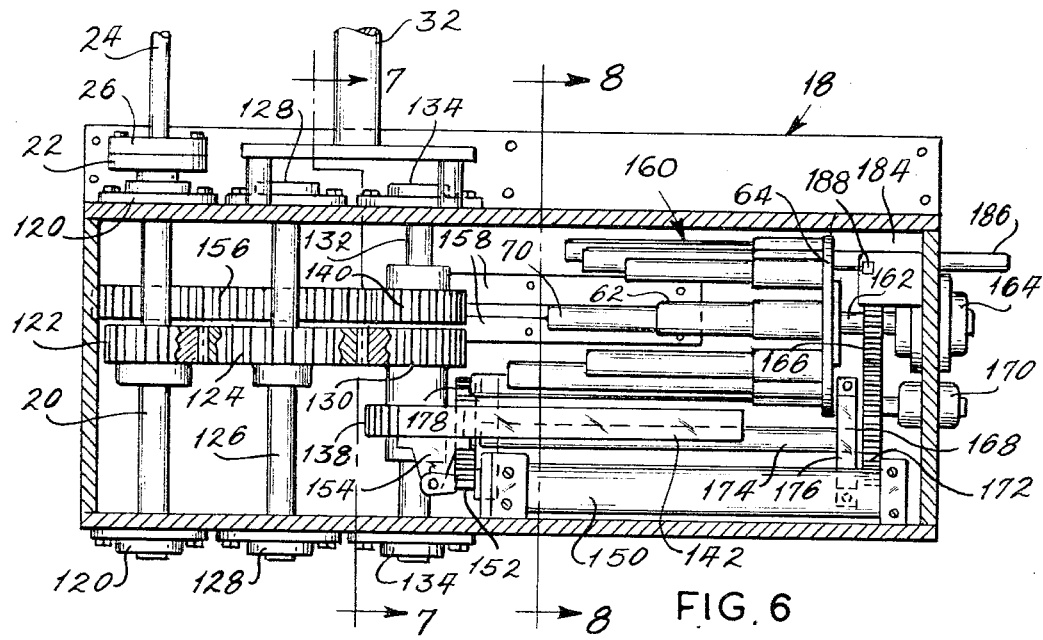
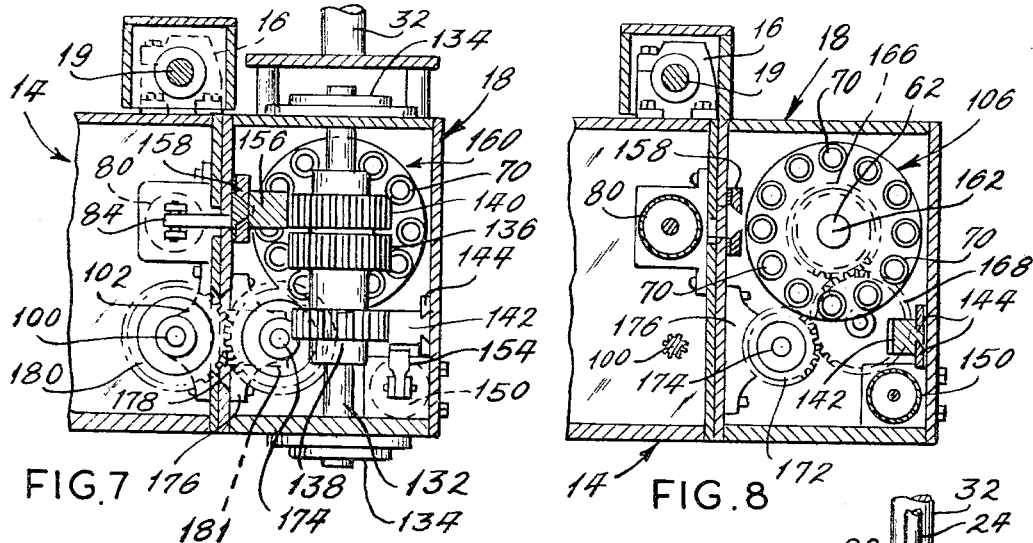
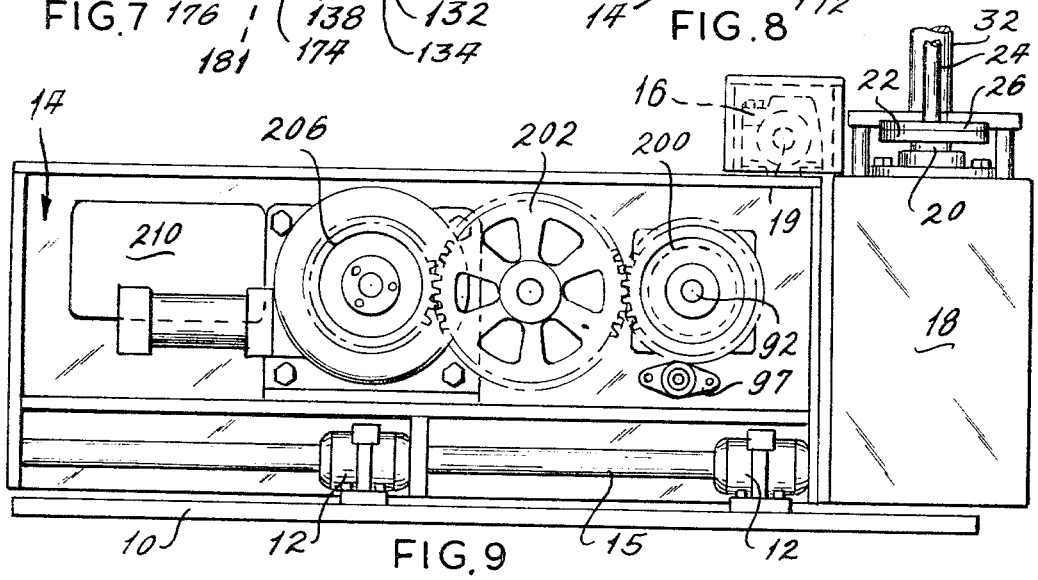

3,754,356

POSITIONING MACHINE

BACKGROUND OF THE INVENTION

This invention relates to an improved positive positioner for an article, and in particular, to a device which holds said article and is capable of moving it in two directions and rotating it to a fixed predetermined position at a proper time and then moving it to another predetermined position.

It is well known that castings made in foundries contain extra material or flash which must be ground off or removed from the casting before the casting is usable. Often the grinding need not be done within high tolerances, and the usual practice is to have a laborer press the casting against a rotating grinding wheel by hand in order to grind off the excess material. Depending upon the casting, the worker may be required to grind the casting at a plurality of places. Sometimes these castings are quite large and heavy, and due to the nature of the casting process, contain much excess material which must be removed. This material is sometimes located in a position where a workman must grind without seeing the material being ground off, so that he must periodically stop and inspect to make certain that he is not grinding off too much material. All of this is time consuming, requires laborers, involves fatigue factors, and is basically a non-uniform "hand" operation.

At present, there is a machine on the market which attempts to grind some castings automatically by clamping the casting within a fixture, moving the casting laterally, and then tilting or rotating the casting to a predetermined position, at which time the casting contacts a grinding wheel, thereby removing the excess material from the casting at that point. This machine is programmed so that the casting is then moved away from the grinding wheel to its second position where more metal must be ground off, such movement being accomplished by limit switches which cause the casting to be moved laterally and/or tilted. The casting is then moved into contact with the grinding wheel at this second point. This process is repeated as many times as is necessary to remove the excess matrial from the casting. For example, some small electrical fittings require eight grinds, so that the machine would be programmed to properly position the casting with respect to the grinding wheel in eight different positions in order to automatically grind the casting by automatic means and without a human laborer. The difficulty with this machine is that it does not properly position the article along two axes, nor does it tilt or rotate the casting accurately, due to the fact that it does not have positive stops. Therefore, the finished casting may not be a proper one, due to the failure of the machine to positively position the casting so that it may be worked upon at the exact point desired. Further, this machine will properly grind only certain types of castings, such as those which are symmetrical and have a hole through their centers.

SUMMARY OF THE INVENTION

The principal object of the present invention is to provide a positive positioner which can position an article positively in any one of a number of predetermined positions and rigidly hold said article in said position so that it can be worked upon with accuracy. Another object of the present invention is to provide a plurality of positive mechanical stopping elements which can be adjusted or varied, mounted on a turret so as to positively position an article at a predetermined position along two axes, and rotate the article a predetermined number of degrees up to and exceeding 360°. Still another object is to provide positive mechanical stopping device for such a machine along the two axes and for the rotation. Another object is to provide a positive positioner for an article, which may be a casting, or may be any other article made from metal, plastic, wood, etc., and on which certain functions such as grinding, drilling, tapping, sawing, stamping, etc. may be performed sequentially or one step at a time. These and other objects and advantages will become apparent hereinafter.

This invention is embodied in a positive positioner for objects and includes two components which move relative to each other and a turret which creates a blockage and by so doing limits the relative movement between the components. The turret is indexed to different positions and in those different positions the blockage may be different in magnitude, in which case the relative positions between the two components vary. This invention also consists in the parts and in the arrangements and combinations of parts hereinafter described and claimed.

DESCRIPTION OF THE DRAWINGS

In the accompanying drawings, which form part of the specification and wherein like numerals and symbols refer to like parts wherever they occur:

FIG. 2 is a sectional view taken along lines 2—2 of FIG. 1;

FIG. 4 is a sectional view taken along lines 4—4 of FIG. 2 and showing another one of the turrets forming part of the present invention;

FIG. 6 is a sectional view taken along lines 6—6 of FIG. 2 and showing the interior of the second carriage;

FIG. 7 is a sectional view taken along lines 7—7 of FIG. 6 and showing the end shaft which controls the operation of the spindle;

FIG. 8 is a sectional view taken along lines 8—8 of FIG. 6 and showing the turrets in the second carriage; and FIG. 9 is an end view of the positioning machine and showing the indexing device for rotating the three turrets.

DETAILED DESCRIPTION

Figure 1:
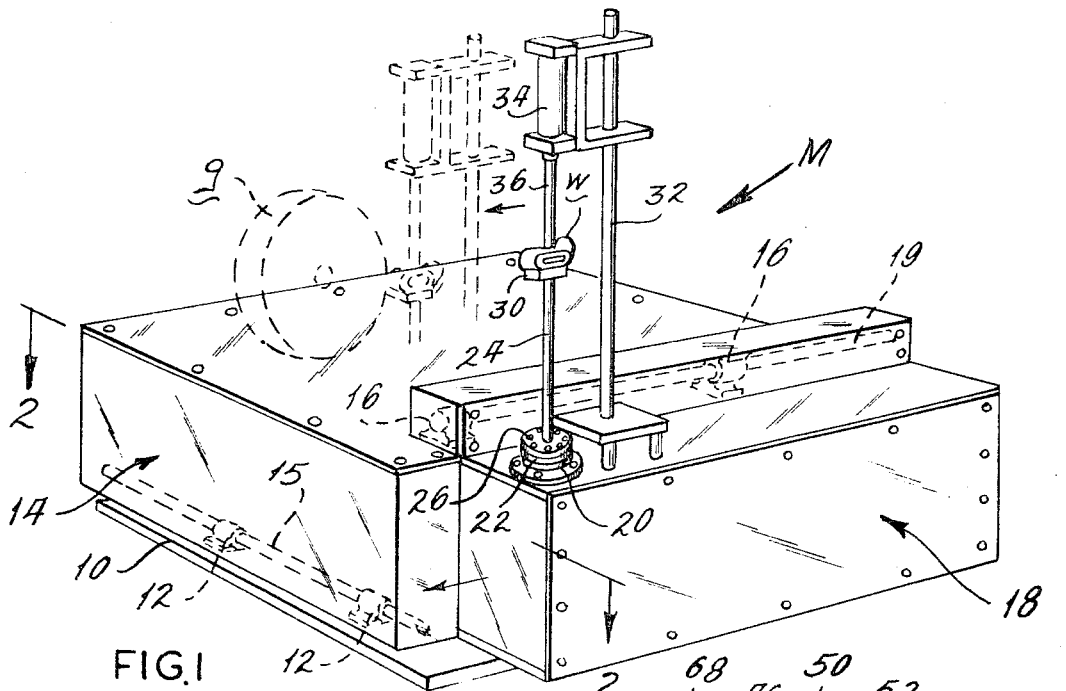
FIG. 1 is a perspective view of a positioning machine constructed in accordance with and embodying the present invention.

Referring now to the drawings (FIG. 1), M designates a machine for positively positioning workpieces w relative to a machine tool which may be a grinder having a grinding wheel g. The machine tool may take other common forms also. For example, it may be a milling machine or a drilling machine. The machine tool is a separate machine from the positioning machine M, and usually the two machines are not in any way connected to one another. They are, however, positioned adjacent to one another and rest upon a firm surface.

The workpiece w illustrated in the drawings (FIG. 1) is a rough aluminum casting having so-called flash which is ground off when the workpiece w is brought against either the side or peripheral face of the wheel g, singly or together. However, the workpiece w may also be a forging or any other rough object that requires finishing.

Figure 5:
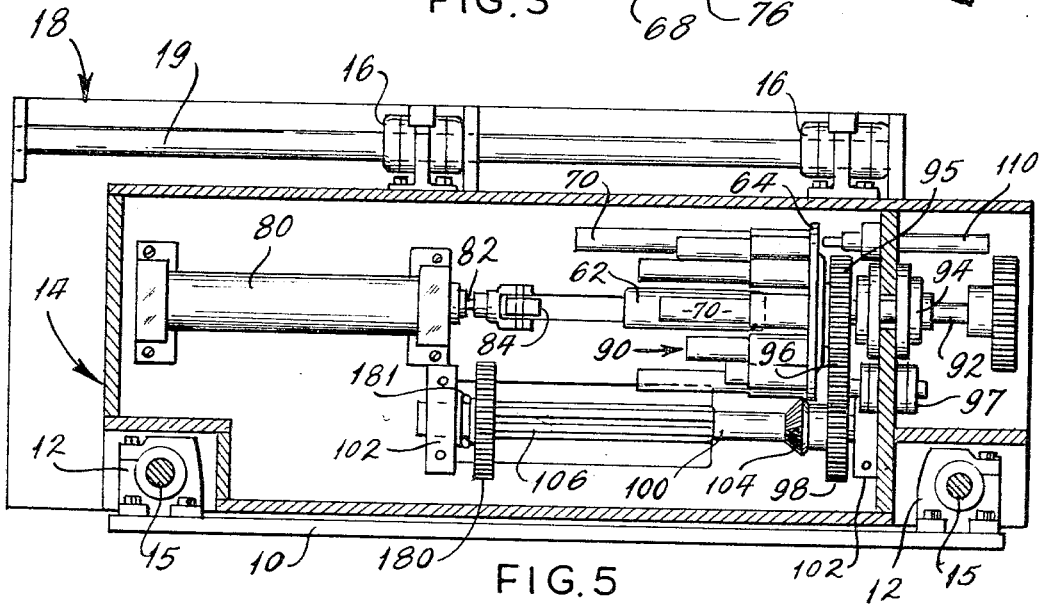
FIG. 5 is a sectional view taken along lines 5—5 of FIG. 2 and showing the turret illustrated in FIG. 4 and the air cylinder used to move the first carriage relative to the second carriage.

The positioning machine M includes (FIG. 1) a base 10 having pillow blocks 12 which support a lower carriage 14 provided with guide rods 15 extended through the pillow blocks 12 (FIGS. 5 and 9). The pillow blocks 12 and the rods 15 are oriented such that the carriage 14 moves parallel to the axis of rotation for the wheel g or in other words crosswise of the wheel g. The carriage 14 at its upper end is likewise provided with pillow blocks 16 which support another or upper carriage 18 having guide rods 19 which extend perpendicular to the guide rods 15 (FIGS. 5 and 9). Hence, the carriage 18 moves on the carriage 14 in a direction perpendicular to the axis of rotation for the wheel 2 or, in other words, forwardly and backwardly with respect to the peripheral surface of the wheel g. The upper carriage 18, in turn, has a spindle 20 journaled therein for rotation about a vertical axis. The spindle 20 is located at the forward end of the carriage 18 and at its upper end is provided with a face plate 22 to which a fixture 24 for the workpiece w is fastened. The fixture 24 has a mounting flange 26 at its lower end, and this flange is bolted to the spindle face plate 22 so that the fixture 24 can be easily detached from the spindle 20 and replaced with a fixture capable of accommodating a different workpiece. At its upper end, the fixture 24 has a support saddle 30 whcih is contoured to match a surface on the workpiece w so that the workpiece w assumes a predetermined position relative to the fixture 24 and spindle 20 when placed on the saddle 30. The surface of the workpiece w which fits against the saddle 30 should not require any machining. The saddle 30 is positioned such that the workpiece w is located at about the height of the axis for grinding wheel g. It is set inwardly from the surfaces of the workpiece w which are scheduled for machining so as not to interfere with those surfaces when they are brought against the grinding wheel g.

In addition to the spindle 20, the carriage 18 carries a clamping device including (FIG. 1) a clamping post 32 which is rigidly fastened at its lower end to the upper carriage 18 slightly to the rear of the spindle 20. The post 32 supports an air cylinder 34 which is disposed directly above the fixture 24 and the cylinder 34 has a ram 36 which is coaxial with the spindle 20 and moves between extended and retracted positions. The ram 36 is spring biased to the retracted position, but when the cylinder 34 is energized, the ram 36 extends and engages the upper surface of the workpiece w so as to hold the workpiece w tightly against the saddle 30 of the fixture 24. The mounting for the cylinder 34 is such that the vertical position of the cylinder 34 may be altered to accommodate workpieces of different shapes. The air cylinder 34 has a solenoid operated valve and through that valve is connected a source of compressed air.

The bottom of the lower carriage 14 is cut away to expose a portion of the base 10, and secured to the exposed portion of base 10 is a double acting air cylinder 40 (FIG. 2) having a ram 42, the axis of which extends parallel to the guide rods 15. At its outer end the ram 42 is coupled to the lower carriage 14. When the ram 42 is retracted, the fixture 24 is located furthest from the side face of the grinding wheel g. However, when the ram 42 extends, it moves the lower carriage over the base 10 and brings the fixture 24 and workpiece w closer to the side face of the grinding wheel g. The ram 42 is, of course, extended by introducing compressed air into the rear end of the cylinder 40, and that air is admitted through a solenoid valve.

The extent to which the air cylinder 40 moves the lower carriage 14 away from its initial position is determined by a positioning turret 50 (FIG. 2) which is housed within the carriage 14 between a stop 52 thereon and another stop 54 which is secured to the exposed portion of the base 10 and projects upwardly into the interior of the carriage 14. More specifically, the positioning turret 50 is mounted on a turret shaft 56 which extends through the interior of the carriage 14 parallel to the guide rods 15 on which that carriage 14 is supported. Near each of its ends the shaft 56 is journaled in bearings 58. Actually, the turret 50 is positoned on one end of the shaft 56, that is the end located rearmost when considering the movement of the carriage 4, and a bevel gear 60 is attached to the opposite end.

The turret 50 includes (FIG. 3) a sleeve-like hub 62 which encircles the shaft 56 and at its end is fitted with a circular end plate 64, one side of which faces the stop 52, but is not normally engaged therewith. The end plate 64 has a pair of keys 65 which engage keyways in the shaft 56. This permits the turret 50 to rotate with the shaft 56, yet allows it to shift axially thereon. The hub 62 houses a coil-type compression spring 66 which urges it against a collar 67 on the shaft 56, and when the hub 62 is against that collar 67 the end plate 64 is spaced from the stop 52. The opposite side of the end plate 64, that is the side presented toward stop 54 (FIG. 2), has a plurality of tubular sockets 68 positioned thereon at equal circumferential intervals, and the axes of these sockets are parallel to the axis of the shaft 56. Each socket 68 contains a positioning rod or pin 70. By turning the shaft 56 different rods 70 are aligned with stop 54, and the distance the lower carriage 14 will move when the air cylinder 40 is energized is dependent on the length of the particular rod 70 positioned opposite the stop 54.

In particular, when the air cylinder 40 is energized, its ram 42 moves from its normally retracted position (FIG. 2) driving the lower carriage 14 sideways and moving the turret 50 and abutment 52 toward the stop 54. In time, the end of that positioning rod 70 which aligns with the stop 54 will engage the stop 54, terminating further movement of the turret 50. The carriage 14, however, will continue to move and as it does the shaft 56 will slide within the hub 62 and the spring 66 will compress. Continued movement of the carriage 14 will bring the back face of the turret end plate 64 against the stop 52, and at this point the movement of the carriage 14 will terminate.

To prevent the end plate 64 from striking the stop 52 with excessive force, the carriage 14 directly to the rear of the turret 50 is provided with a plunger-type cushioner 72 (FIG. 2), and the plunger of this device projects forwardly beyond the stop 52 and engages the back face of the end plate 64 during the final increment of movement for the carriage 14. In effect, the cushioner 72 causes the carriage 14 to decelerate and come to a gentle rest against the stop 52. Also located on the stop 52 is a microswitch 74 which is engaged by the back face of the end plate 64 and is closed when the end plate 64 comes against the stop 52.

Figure 3:
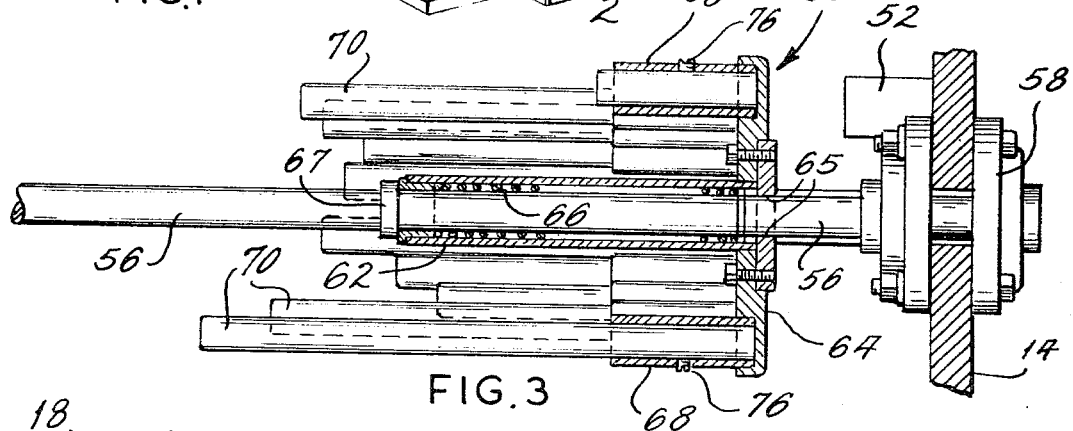
FIG. 3 is a sectional view taken along lines 3—3 of FIG. 2 and showing one of the turrets forming part of the present invention.

The rods 70 should be easily detachable from the sockets 68 and to this end are secured thereto by set screws 76 (FIG. 3). In lieu of the set screws 76, the sockets 68 may be provided with circumferentially extending slots (not shown) which open outwardly and receive a garter spring which embraces the full complement of sockets 68. The rods 70 in that case would have annular grooves positioned to align with the slots so as to also receive the garter spring.

Mounted on the end of the lower carriage 14 presented adjacent to the upper carriage 18 is another double acting air cylinder 80 (FIGS. 2 and 5), the axis of which is parallel to the rods 19 on the upper carriage 18 and perpendicular to the rods 15 on the lower carriage 14. The air cylinder 80 includes a ram 82 which is normally maintained in its retracted position. At the outer end of the ram 82, the end wall of the lower carriage 14 is cut away to expose the upper carriage 18 and extending from the upper carriage 18 into the interior of the lower carriage 14 through this cut away portion is a projection 84. The ram 82 is coupled to this projection 84. Thus, when the air cylinder 80 is energized such that the ram 82 extends, the upper carriage 18 will be driven forwardly on the lower carriage 14, that is it will be driven toward the circumferential face of the grinding wheel g. The air cylinder 80 is incorporated into the same pneumatic circuit as the air cylinder 40 and likewise has a solenoid valve for admitting compressed air to it.

The forward motion of the upper carriage 18 on the lower carriage 14 is controlled by another turret 90 (FIGS. 2 and 5) which is mounted on a turret shaft 92 extending parallel to the axis of the air cylinder 80. The shaft 92 is in effect a stub shaft journaled in a double bearing 94 mounted on an interior wall of the carriage 14. Like the turret 50, the turret 90 has a hub 62 which fits over the shaft 92, an end plate 64 on the hub 62 and loosely keyed to the shaft 92, sockets 68, and a plurality of positioning rods 70. Being loosely keyed to the shaft 92, the turret 80 is free to shift axially a limited distance thereon, yet will rotate with the shaft 92. The hub 62 contains a coil spring 66 which urges the entire turret 90 away from its bearing 94.

Between the end plate 64 of the turret 90 and the bearing 94, the shaft 92 is fitted with a spur gear (FIGS. 2 and 5) 95 which meshes with an idler gear 96 journaled in a double bearing 97 on the interior wall of the carriage 14. The idler gear 96 in turn meshes with a gear 98 on a synchronizer shaft 100 extending through a major portion of the lower carriage 14. The synchronizer shaft 100 is disposed beneath the turret 90 and is journaled in bearings 102 mounted on the carriage 14. Immediately beyond the gear 98, that is directly below the turret 90, the shaft 100 is fitted with a bevel gear 104 which meshes with the bevel gear 60 at the end of the shaft 56 which carries the turret 50. A one-to-one ratio exists between the two spur gears 95 and 98 and likewise between the two bevel gears 60 and 104, and consequently the shafts 100, 56 and 92 will rotate through angles of equal magnitude. At its opposite end the shaft 100 extends below the projection 84 on the upper carriage 18, and this portion of the shaft has a relatively long spline 106.

The mechanical connection between the two turret shafts 56 and 92 is such that when a positioning rod 70 on the turret 50 aligns with the stop 54 on the base 10, a positioning rod 70 of the turret 90 will align with the projection 84 on the upper carriage 18. Consequently, when the air cylinder 80 is energized and the ram 82 extends therefrom, the resulting movement of the upper carriage 18 will bring its projection 84 into engagement with the end of the aligned positioning rod 70 on the turret 90. Continued movement of the carriage 18 moves the entire turret 90 over its turret shaft 92 and against the bias of the compression spring 66 housed within the hub 62 of that turret. The air cylinder 80 continues to move the carriage 18 until the back face of the end plate 64 of the turret 90 engages an abutment 108 (FIG. 2) which is fixed in position on the carriage 18. Thus, the projection 84 functions as a stop or abutment for the positioning rods 70 of the turret 90.

Immediately to the rear of the turret 90, the lower carriage 14 has plunger type cushioner 110, the plunger of which engages the end plate 64 of the turret 90 before it strikes the abutment 108, causing the turret 80 to decelerate. This prevents the turret 90 from striking the abutment 108 with excessive force. When the turret 90 strikes the abutment 108, it also closes a microswitch 112 which is located on the abutment 108.

From the foregoing, it is apparent that the workpiece w is moved toward and away from the side face of the grinding wheel g by the air cylinder 40, and the extent of movement is controlled by the turret 50. It is equally apparent that the workpiece w is moved toward and away from the circumferential face of the grinding wheel g by the air cylinder 80, and that the extent of movement is controlled by the turret 90.

The workpiece w is subjected to one additional positioning movement on the machine M preparatory to grinding against the wheel g, and that additional movement is rotational in nature. It is effected by rotating the spindle 20. To this end the spindle 20 is journaled in bearings 120 (FIG. 6) which are fitted to the upper carriage 18. Between its ends the spindle 20 is provided with a spur gear 122 which meshes with an idler gear 124 on an idler shaft 126 located next to, but rearwardly from, the spur gear 122. The idler shaft 126 is likewise journaled in bearings 128 fitted to the upper carriage 18. The idler gear 124 engages a pinion gear 130 fastened to a spindle positioning end shaft 132 which is journaled in bearings 134 fitted to the upper carriage 18. The pinion gear 136 is the same size as the spur gear 122, and hence the spindle 20 will rotate exactly the same amount as the shaft 132. In addition to the pinion gear 136, the end shaft 132 is provided with two additional gears 138 and 140. The gear 138 is disposed below the pinion gear 136 and is engaged with a rack 142 which moves in a way 144 (FIGS. 7 and 8) on the outer side of the carriage 18, the movement being in the same direction as the movement of the upper carriage 18 on the lower carriage 14.

Positioned beneath the rack 142 and secured to the upper carriage 18 is a double acting air cylinder 150 (FIGS. 2, 6 and 7) having its axis parallel to the guide rod 19 of the upper carriage 18. The cylinder 150 includes a ram 152, the free end of which is connected to a tab 154 on the underside of the rack 142. When the ram 152 is retracted, the teeth at the forward end of the rack 142 are engaged with the gear 138. As the ram 152 extends, it drives the rack 142 forwardly on its way 144 and this of course rotates the gear 138 and the end shaft 132 on which that gear is disposed. As a result, the pinion gear 130 also rotates and this motion is transmitted to the spur gear 122 through the idler gear 124. Thus, the extension of the ram 148 from the cylinder 146 results in rotation of the spindle 20 and a change in the angular position of the workpiece w. The idler gear 124 is somewhat larger than the spur gear 122 and pinion gear 130 with which it meshes and as the rack 142 moves forwardly it passes beneath the idler gear 124. The length of the rack 142 and the ram 152 is sufficient to rotate the spindle 20 a maximum of approximately 365°. The air cylinder 150 is incorporated into the same pneumatic circuit as the air cylinders 34, 40 and 80 and is provided with solenoid valve for admitting compressed air to it.

The other gear 140 (FIGS. 6 and 7) is keyed to the shaft 132 above the pinion gear 136, and that gear meshes with a rack 156 which moves in a way 158 affixed to the inner side of the upper carriage 18. When the ram 152 of the air cylinder 150 is retracted and the lower rack 142 controlled thereby is engaged at its forward end with the gear 138, the rear end of the upper rack 156 is engaged with the gear 140 and the center portion of that rack 156 is disposed over the enlarged idler gear 124. Thus, the two racks 142 and 156 are linked together through the end shaft 132 and the gears 138 and 140 on that shaft. Consequently, when the ram 152 extends and the lower rack 142 is driven forwardly, the upper rack 156 will be driven rearwardly a corresponding distance.

The distance the upper rack 156 moves in the rearward direction is controlled by a turret 160 (FIGS. 2, 6 and 8) which is carried by the upper carriage 18 and is centered between the ways 144 and 158 to the rear of the end shaft 132. Since the spindle 20 is coupled to the upper rack 156 through the gears 122, 124, 130 and 140, the angular position of the spindle 20 and the workpiece w carried thereon is also controlled by the turret 160. The turret 160 is mounted on a turret shaft 162 which is journaled in a double bearing 164 bolted to the back wall of the upper carriage 18. The axis of the turret shaft 162 is parallel to the guide rod 19 on which the upper carriage 18 is guided and to the axis of the air cylinder 150.

The positioning turret 160 is similar to the turrets 50 and 90 and like those turrets includes a hub 62, an end plate 64 at the rear end of the hub 62 and loosely keyed to the turret shaft 162, a coil spring 66 within the hub 62, sockets 68 projecting forwardly from the end plate 64, and positioning rods 70 within the sockets 68. Since the end plate 64 is loosely keyed to the shaft 162, the turret 160 will rotate with the shaft 162, but is nevertheless free to shift axially a limited distance thereon. The spring 66 urges the turret 160 away from the bearing 164 for the shaft 162, that is it urges the turret 160 toward the upper rack 156.

Between the end plate 64 of the turret 160 and the bearing 164, the turret shaft 162 is provided with a spur gear 166 which meshes with an idler gear 168 journaled for rotation in a double bearing 170 bolted against the back wall of the upper carriage 18. The idler gear 168 in turn meshes with a gear 172 at the rear end of a connecting shaft 174 which extends longitudinally through the upper carriage 18 adjacent to the inner wall thereof, that is adjacent to the wall located closet to the lower carriage 14. Indeed, the connecting shaft 174 is journaled in bearings 176 bolted against the inner wall of the upper carriage 18. Adjacent to the forward end of the connecting shaft 174, the inside wall of the upper carriage 18 is cut away and so is the opposite wall of the lower carriage 14. The cutout in the wall of the upper carriage 18 is only large enough to accommodate a transfer gear 178 which is attached to the forward end of the connecting shaft 174. The cutout in the wall of the lower carriage 14, however, is considerably longer, and indeed is slightly greater in length than the stroke of the air cylinder 80 which moves the upper carriage 18. The cutout in the wall of the lower carriage 14 is directly opposite to the spline 106 of the synchronizer shaft 100 extending through the lower carriage 14. Positioned on that spline 106 is another transfer gear 180 in the upper carriage 18 and that gear 180 meshes with the gear 178, being maintained in engagement therewith by a yoke 181 (FIG. 5) on the upper carriage 18. The yoke 181 engages a groove in the hub of the gear 180.

Thus, as the air cylinder 80 moves the upper carriage 18 on the lower carriage 14 the gear 180 slides along the spline 106 of the synchronizer shaft 100, yet still remains engaged with the gear 178 on the connecting shaft 174 of the upper carriage 18. The splined connection between the gear 180 and its shaft 100 enables the gear 180 to rotate with the shaft 100 irrespective of its axial position on the spline 106. Thus, the shaft 100 of the lower carriage 14 is connected with the turret shaft 162 on which the turret 160 is mounted by means of a drive train comprised of the transfer gears 180 and 178, the connecting shaft 174, and the gears 172, 168 and 166. The ratio of this drive train is one-to-one so that the turret shaft 162 experiences the same angular displacement as the synchronizer shaft 100 in the lower carriage 14. Moreover, the connection is such that when one of the positioning rods 70 of the turret 50 aligns with the stop 54 on the base 10, in which case one of the positioning rods 70 of the turret 90 will also align with the projection 84 from the upper carriage 18, and one of the positioning rods 70 of the turret 160 will align with the end of the upper rack 156.

When the air cylinder 150 within the upper carriage 18 is energized the ram 152 thereof moves outwardly from its retracted position and drives the lower rack 142 forwardly. This, of course, rotates the spindle 20 and the workpiece w supported thereon. The upper rack 156, on the other hand, moves rearwardly and in time engages the end of the positioning rod 70 aligned with it. Continued movement of the rack 156 shifts the turret 160 rearwardly on its turret shaft 162 against the force exerted by the spring 68. After a short distance the back face of end plate 64 on the turret 160 will engage an abutment 184 on the back wall of the upper carriage 18, at which time movement of the racks 142 and 156 will cease. Thus, the magnitude of the angular displacement experienced by the spindle 20 is dependent on the distance traveled by the upper rack 156, and that in turn is dependent on the length of the positioning rod 70 engaged by the end of the upper rack 156.

Mounted on the back wall of the upper carriage 18 directly behind the turret 160 is a plunger-type cushioner 186 for preventing the end plate 64 of the turret 160 from striking the abutment 184 with excessive force. The abutment 184 has a microswitch 188 mounted upon it directly behind the turret 160, and that microswitch closes when the end plate 64 engages the abutment 184.

Referring now to the turret shaft 92 for the turret 90, the outer end of that shaft 92 is provided with a spur gear 200 which meshes with an idler gear 202 journaled in a double bearing 204 bolted against the interior cross wall of the lower carriage 14. The idler gear 202 in turn meshes with a turret drive gear 206 which is the same size as the spur gear 200 so that a one-to-one ratio exists between the two gears 200 and 206. Thus, when the drive gear 206 is rotated through a predetermined angle, the turret shaft 92 will rotate through the same angle, and likewise so will the synchronizer shaft 100 and the two remaining turret shafts 56 and 162, since the drive train between the drive gear 206 and the three turret shafts 56, 92 and 162 possess a one-to-one ratio. Thus, when the drive gear 206 is angularly displaced, the three turrets 50, 90 and 160 will experience an equivalent angular displacment.

The drive gear 206 is positioned on and rotated by an air operated indexing device 210, which is bolted against the interior wall of the lower carriage 14. This device is connected to the pneumatic circuit in which the air cylinders 34, 40, 80 and 150 are located, and includes a solenoid valve for admitting compressed air to it. When energized, the indexing device 210 rotates the drive gear 206 through a predetermined angle, and that angle equals the angle between adjacent positioning rods 70 on the turrets 50, 90 and 160. For example, if each turret 50, 90 and 160 has 12 positioning rods, the indexing device 210 would rotate the drive gear 206 30° each time it is energized. Hence each time the indexing device 210 is energized, a different positioning rod 70 is positioned in alignment with the stop 54 on the base 10, the projection 84 on the upper carriage 18, and the end of the upper rack 156 in the carriage 18. Since the positioning rods 70 control the lateral, forward and angular disposition of the workpiece w, the lateral, forward and angular disposition will change with each operation of the indexing device 210, provided of course, that the successive positioning rods 70 on the turrets 50, 90 and 160 are of different length.

The indexing device 210 which is illustrated is a so-called dial feed table set to index 30°. It may also take other forms such as a Geneva wheel or a Ferguson cam.

The solenoid valves of the air cylinders 34, 40, 80 and 140 and of the indexing device 210 as well as the microswitches 74, 112 and 188 are all connected with a controller (not shown) which automatically operates the valves pursuant to a predetermined program. Usually the valves for the air cylinders 40, 80 and 150 are operated in a predetermined sequence, and that sequence is such that the air cylinder 150 is first energized, then the cylinder 40, and finally the cylinder 80. This means that the workpiece w is first rotated to the proper angular position, then moved sidewise by the upper carriage 18 to the proper lateral position, and finally advanced forwardly into the grinding wheel g by the forward movement of the upper carriage 18. The valves 40, 80 and 150 may be programmed to operate in a different sequence, and the sequence utilized is to a large measure determined by the workpiece and the grinds to be made thereon. For example, if the workpiece is round and a peripheral grind is to be made thereon the valves for the cylinders 40 and 80 would first be energized to position the carriages 14 and 18, and thereafter the valve for the cylinder 150 would be energized to cause the spindle 20 to revolve and rotate the workpiece against the grinding wheel g.

OPERATION

The set-up procedure for the machine M initially involves preparing a fixture 24 with a saddle 30 contoured to accommodate the workpiece w. This fixture 24 is bolted against the face plate 22 of the spindle 20. The air cylinder 34 is then adjusted to the correct height, care being taken to insure that its ram 36 remains coaxial with the spindle 20.

In addition to preparing the fixture 24 and adjusting the air cylinder 34, positioning rods 70 are prepared for the three turrets 50, 90 and 160. Each grind on the workpiece w is determined by a set of three rods 70, one for each turret 50, 90 and 160. Considering only one set of turret rods 70, the rod 70 in the turret 160 controls the angular disposition of the spindle 20, and its length should be such that the workpiece surface scheduled for the grind will be in the proper lateral position with respect to the grinding face of the wheel g. The rod 70 in the turret 90 controls the forward movement of the upper carriage 18 and its length should be such that the workpiece surface scheduled for the particular grind is moved far enough toward or into the grinding wheel g. The foregoing selection procedure for the rods 70 is repeated for each grind scheduled for the workpiece w.

The positioning rods 70 are installed in the turrets 50, 90 and 160 so that the rods 70 of each set will come into their respective control positions simultaneously. The control position for a rod 70 in the turret 160 is when that rod aligns with the rear end of the upper rack 156; for a rod 70 in the turret 50 when that rod aligns with the stop 54 on the base 10; and for a rod 70 in the turret 90 when that rod aligns with the projection 84.

After the workpiece w is placed on the fixture 24, the automatic controller is energized, and it causes the positioning machine M to operate as follows: First, the controller energizes the solenoid valve on the air cylinder 34, so that compressed air is admitted to that cylinder. The compressed air drives the ram 36 downwardly into engagement with the workpiece w, thus clamping the workpiece w tightly against the saddle 30. Thereafter, the controller opens the solenoid valve on the air cylinder 150 and compressed air is admitted to that cylinder 150, driving the ram 152 outwardly. The ram 152 moves the lower rack 142 forwardly, and the rack 142 rotates the end shaft 132. The spindle 20, being connected to the end shaft 132 through the gears 122, 124, and 130, also rotates, changing the angular disposition of the workpiece w. The upper rack 156, being also connected to the end shaft 132 through the gear 140, moves rearwardly and in time its rear end will engage the free end of one of the rods 70 in the turret 160. The turret 160 will be driven rearwardly against the resistance of the spring 66 in its hub 62 and against the resistance of the cushioner 186. After a short distance, the end plate 64 of the turret 160 will come against the abutment 182 with relatively little impact, and when this occurs the movement of the upper rack 156 will cease. At that time the workpiece face scheduled for grinding will be at the proper angular position with respect to one of the grinding faces of the wheel g.

Compressed air is maintained in the cylinder 150 to hold the workpiece w in that position. When the turret 160 engages the abutment 184, it also closes the microswitch 188, and this switch signals the controller that the workpiece w has reached the proper angular position.

Thereafter, the controller opens the solenoid valve of the air cylinder 40, admitting compressed air to that cylinder and causing the ram 42 to extend therefrom. The ram 42 moves the lower carriage 14 laterally until the turret 50 becomes lodged between stop 54 on the base 10 and the stop 52 on the carriage 14. Actually the end of the rod 70 which is in the control position will engage the stop 54, while the end plate 64 on the turrent 50 will engage the stop 52. When this occurs, the workpiece face scheduled for the grind will be in the proper lateral position with respect to the selected grinding face of the grinding wheel g. The controller will maintain compressed air in the cylinder 40 so that the workpiece w remains in the proper lateral position. When the turret 50 engages the abutment 52 it will close the microswitch 74, and the microswitch 74 will signal the controller that the lateral movement is complete.

Once the lateral movement is completed, the controller opens the solenoid valve of the air cylinder 80, and the compressed air admitted thereto drives the ram 82 outwardly. The ram 82 in turn moves the upper carriage 18 toward the grinding wheel g, and the movement continues until the turret 90 becomes lodged between the upper carriage projection 84 and the abutment 108. In that case, the free end of that positioning rod 70 which is in the control position on the turret 90 will bear against the projection 84 and the end plate 64 of the turret 90 will bear against the abutment 108. As the air cylinder 80 moves the upper carriage 18 to the foregoing terminal position, the workpiece surface scheduled for grinding is brought against the selected grinding face of the wheel g, and the grind is completed. The completion of the grind is signaled by the closure of the microswitch 112 which occurs when the turret 90 comes against the abutment 108.

Once the grind is completed, the controller operates the air cylinders 150, 40 and 50 in the reverse order and the workpiece w is brought back to its initial position. This is achieved by admitting air to the opposite ends of the air cylinders 150, 40 and 50 through the solenoid valves thereof.

Immediately after the workpiece w returns to its initial position, the controller opens the solenoid valve on the air operated indexing device 210, and the indexing device rotates the drive gear 206 through an angle equalling the angular spacing between adjacent rods 70 on the turrets 50, 90 and 160. Since the ratio of the drive train between the gear 206 and each of the turrets 50, 90 and 160 is one-to-one, the turrets 50, 90 and 160 will move through an equivalent angle, bringing the succeeding set of positioning rods 70 into the control position.

Thereafter, the controller again operates the cylinders 150, 40 and 80 as previously described. However, at least one of the rods 70 of the subsequent set will possess a different length than its corresponding rod 70 in the previous set, so that the rods 70 of the subsequent set will position the workpiece w for grinding another surface thereon.

While a mechanical shock is produced when the turret 50 terminates the movement of the lower carriage 14, when the turret 90 terminates the movement of the upper carriage 18, and when the turret 160 terminates the movement of the rack 156, the shocks are kept within acceptable limits by the cushioneers 72, 110 and 186, and are not damaging to the machine M. Since the movement of the carriages 14 and 18 and the spindle 20 usually varies with each set of positioning rods 70, it is impossible to effect the cushioning within the cylinders 40, 80 and 150 themselves, as is the usual practice. In other words, the rams 42, 82 and 152 for the cylinders 40, 80 and 150 are never fully extended before their movement is terminated, and the termination of the movement varies from one positioning rod 70 to the next. Hence, it is impossible to build any type of buffering arrangement into the cylinders 40, 80 and 150 for the extended positions. For the return positions, the situation is different, inasmuch as the rams 42, 82 and 152 always return to the same position, and in that position are fully retracted in their respective cylinders 40, 80 and 150. Indeed, the cylinders 40, 80, and 150 have cushioning devices built into them for absorbing shocks as their rams 40, 80 and 150 return to their fully retracted positions. Thus, cushioning is provided for the cylinders 40, 80 and 150 when the rams 42, 82 and 152 thereof reach both their extended and retracted positions.

The sets of rods 70 will correspond in number to the grinds scheduled for the workpiece w, and at the completion of the last grind, the controller will activate the indexing device 210 until it returns to its initial position. Thus, if any sockets 68 are unused in the turrets 50, 90 and 160, the controller will merely cause the indexing device 210 to step those unused sockets 68 through the control positions without energizing the air cylinders 40, 80 and 150. As the indexing device 210 returns the turrets 50, 90 and 160 to their initial position, the controller deactivates the air cylinder 34 so that the ram 36 thereof releases the workpiece w. The finished workpiece w is then removed from the fixture 24 and replaced with another rough workpiece w.

If the number of grinds for a particular workpiece w is equal to or less than twice, thrice, etc., the number of stops for the turrets 50, 90 and 150 in a complete cycle, duplicate, triplicate, etc. groups of rods 70 may be employed in sequence on the turrets 50, 90 and 150, in which case it would not be necessary to step the turrets 50, 90 and 150 back to their initial position upon the completion of each workpiece w. The controller, of course, would be programmed to deactivate the cylinder 34 and release the workpiece w between each group of identical rods.

The rods 70 are easily withdrawn from the tubular members 68 of the turrets 50, 90 and 160, merely by loosening the set screws 76, while the fixture 24 is removed from the face plate 22 of the spindle 20 with equal ease. Consequently, the time required to change the machine M for use with workpieces w of a different configuration is a matter of minutes, assuming that positioning rods 70 and a fixture 24 are already available for the workpieces of the different configuration.

To compensate for wear of the grinding wheel g, the base 10 should be mounted on an adjustable sub-base which preferably is shiftable both laterally and to and fro with respect to the wheel g, that is shiftable in the same directions as the carriages 14 and 18. The shifting may be effected by worm screws which are manually rotated. Mounting the machine M on an adjustable sub-base not only compensates for grinding wheel wear, but also conserves compressed air inasmuch as the machine may be repositioned for each workpiece of different configuration, thus enabling it to be postioned such that the least amount of carriage movement, and with it the least amount of cylinder movement, is required. The sub-bases need only be manually adjustable.

The air cylinders 40, 80, and 150 are actually motors which effect the various movements of the machine M. While air cylinders have been described, hydraulic cylinders, or for that matter any other type of suitable motor, may be utilized in lieu of air cylinders to cause the movements.

This invention is intended to cover all changes and modifications of the example of the invention herein chosen for purposes of the disclosure which do not constitute departures from the spirit and scope of the invention.

What is claimed is:

1. An apparatus for positioning an object in a plurality of predetermined positions, said apparatus comprising: a base; a first carriage mounted on and movable relative to the base; a first motor connected between the base and the first carriage for moving the first carriage relative to the base; stop surfaces positioned on the first carriage and base such that distance between them varies as the carriage moves relative to the base; a first rotatable turret positoned to engage the stop surfaces and form a blockage between them after the carriage has moved a predetermined distance, the turret having a plurality of elongated positioning elements which as the turret rotates individually pass through a control position wherein their ends align with one of the stop surfaces, whereby the distance the first carriage moves is dependent on the length of that positioning element in the control position, indexing means connected with the first turret for rotating that turret such that the individual positioning elements are moved into the control position; and a holder supported by and shiftable with the first carriage for holding the object.

2. An apparatus according to claim 1 wherein the first turret is mounted on a shaft and the indexing means rotates the shaft.

3. An apparatus according to claim 2 wherein the first turret includes an end plate and sockets opening out of one side of the end plate; and wherein the ends of the elongated positioning elements are fitted into the sockets so that the positioning elements project away from the end plate.

4. An apparatus according to claim 3 wherein the other stop surface is located behind the turret end plate and engages the end plate when the turret is lodged between the two stop surfaces.

5. An apparatus according to claim 2 wherein the shaft on which the first turret is mounted is substantially parallel to the direction of movement for the first carriage; and wherein the turret is axially shiftable a limited distance on the shaft and is normally spaced from the other stop surface also, so that the positioning elements first engage said one stop surface and thereafter the turret moves along its shaft and engages said other stop surface.

6. An apparatus according to claim 5 wherein the turret is normally spring biased away from said other stop surface.

7. An apparatus according to claim 5 wherein the shaft on which the first turret is mounted is mounted on the first carriage.

8. An apparatus according to claim 1 and further characterized by second carriage mounted on and movable relative to the first carriage, a second motor connected between the first and second carriages for moving the second carriage relative to the first carriage; stop members positioned on the first and second carriages such that the distance between them varies as the second carriage moves relative to the first carriage, a second rotatable turret positioned to engage the stop members and to form a blockage between them after the second carriage has moved predetermined distance relative to the first carriage, the second turret also having a plurality of elongated positioning elements which as the second turret rotates individually pass through a control position, wherein their ends align with one of the stop members, whereby the distance the second carriage moves relative to the first carriage is dependent on the length of that positioning element in the control position; and wherein the holder for supporting the object is mounted on the second carriage.

9. An apparatus according to claim 8 wherein the indexing means also rotates the second turret such that the individual positioning elements are moved into the control position.

10. An apparatus according to claim 9 wherein the first and second turrets are mounted on first and second turret shafts, respectively; and wherein the indexing means rotates both shafts in unison such that positioning elements on both shafts are concurrently brought into their respective control positions.

11. An apparatus according to claim 10 and further characterized by a turret synchronizer shaft mounted on the first carriage and connected with the first and second turret shafts; and wherein the indexing means drives the turret synchronizer shaft.

12. An apparatus according to claim 8 and further characterized by a rotatable spindle mounted on the second carriage and means for rotating the second spindle to and holding it in predetermined angular positions; and wherein the holder is mounted on the spindle.

13. An apparatus according to claim 8 and further characterized by an object positioning shaft journaled on the second carriage, a third motor carried by the second carriage and connected with the object positioning shaft for rotating that shaft, a gear on the object positioning shaft, a rack engaged with the gear, abutment surfaces positioned on the rack and the second carriage such that the distance between them varies as the rack moves, a third rotatable turret carried by the second carriage and positioned to engage the abutment surfaces and form a blockage between them after the rack has moved a predetermined distance and the object positioning shaft has rotated through a predetermined angle; the third turret having a plurality of elongated positioning elements which, as the third turret rotates, pass through a control position, wherein their ends align with one of the abutment surfaces, whereby the distance the rack moves and the angle through which the object positioning shaft is displaced is dependent on the length of that positioning element in the control position; and wherein the object holder is connected to the object positioning shaft and rotated thereby.

14. An apparatus according to claim 13 wherein the first, second, and third turrets are mounted on first, second, and third turret shafts, respectively; wherein a turret synchronizer shaft is connected with the first, second and third turret shafts such that when the synchronizer shaft rotates the three turrets move in unison and the positioning elements thereon are concurrently brought into their respective control positions; and wherein the indexing means is connected to the turret synchronizer shaft.

15. An apparatus according to claim 14 wherein the turret synchronizer shaft is carried by the first carriage and has an elongated spline; wherein a transfer gear is mounted on the second carriage and connected with the third turret shaft thereon; and wherein another transfer gear is mounted on the spline of the turret synchronizer shaft and moves axially on that shaft as the second carriage moves relative to the first carriage, whereby the two transfer gears remain engaged.

16. An apparatus for angularly positoning an object, said apparatus comprising a frame, an object positioning shaft mounted for rotation on the frame, a motor connected with the shaft for rotating the same, a gear on the shaft, a rack carried by the frame and engaged with the gear whereby the rack will move as the shaft rotates; abutment surfaces positioned on the rack and frame such that the distance between the surfaces varies as the rack moves, a rotatable turret carried by the frame and positioned to engage the abutment surfaces and form a blockage betwen them after the rack is moved through a predetermined distance and the object positioning shaft has rotated through a predetermined angle, the turret having a plurality of elongated positioning elements which, as the turret rotates, pass through a control position wherein their ends align with one of the abutment surfaces, whereby the distance the rack moves and the angle through which the object positioning shaft is displaced is dependent on the length of that positioning element in the control position; and a holder for supporting the object, the holder being connected with and rotated by the object positioning shaft.

17. An apparatus according to claim 16 and further characterized by another rack mounted on the frame and engaged with a gear on the object positioning shaft; and wherein the motor is connected to and moves the other rack.

18. An apparatus according to claim 1 wherein the first turret is spaced from both stop surfaces when the indexing means rotates the turret, wherein the turret engages one of the stop surfaces before the other stop surface after the motor is energized so that for a portion of the carriage movement the turret shifts with the carriage; and wherein cushioning means are provided for decelerating the first carriage as the turret approaches the other stop surface so that the turret does not strike the other surface with excessive force.

* * * * *